United States Patent
Hartman et al.

(10) Patent No.: US 10,140,232 B2
(45) Date of Patent: Nov. 27, 2018

(54) PERIPHERAL COMPONENT INTERFACE (PCI) SYSTEM AND METHOD FOR EXPANDING PCI NODES IN AN INFORMATION HANDLING SYSTEM

(71) Applicant: DELL PRODUCTS, L.P., Round Rock, TX (US)

(72) Inventors: Corey Dean Hartman, Round Rock, TX (US); Curtis Ray Genz, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 340 days.

(21) Appl. No.: 14/572,913

(22) Filed: Dec. 17, 2014

(65) Prior Publication Data
US 2016/0179727 A1    Jun. 23, 2016

(51) Int. Cl.
G06F 13/40 (2006.01)
G06F 13/42 (2006.01)

(52) U.S. Cl.
CPC ...... G06F 13/4022 (2013.01); G06F 13/4045 (2013.01); G06F 13/4221 (2013.01)

(58) Field of Classification Search
CPC .......... G06F 1/181; G06F 1/185; G06F 13/12; G06F 13/14; G06F 13/20; G06F 13/36; G06F 13/38; G06F 13/40; G06F 13/4004; G06F 13/4022; G06F 13/4027; G06F 13/4045; G06F 13/4221
See application file for complete search history.

(56) References Cited

U.S. PATENT DOCUMENTS

| | | | | |
|---|---|---|---|---|
| 8,416,570 B2 * | 4/2013 | Zeng | ................. | H05K 7/20545 165/104.33 |
| 2006/0282886 A1 * | 12/2006 | Gaug | ................. | H04L 63/1408 726/5 |
| 2007/0089446 A1 * | 4/2007 | Larson | ............... | G05D 23/1931 62/259.2 |
| 2008/0005372 A1 | 1/2008 | Bolen et al. | | |

(Continued)

OTHER PUBLICATIONS

"SC829 Chassis Series User's Manual". Revision 1.0. Aug. 1, 2012. Super Micro Computer, Inc.*

(Continued)

Primary Examiner — Thomas J Cleary
(74) Attorney, Agent, or Firm — Isidore PLLC

(57) ABSTRACT

An information handling system (IHS), peripheral component interface (PCI) system and method for expanding PCI nodes in an IHS. The PCI system includes a primary PCI node. The primary PCI node has a PCI switch communicatively coupled to a processor via a system interconnect. The PCI switch is communicatively coupled to several PCI devices. A communication module is communicatively coupled to the PCI switch. A PCI expansion node is communicatively coupled to the primary PCI node via a PCI bus and a sideband bus. The IHS executes firmware that enables expansion of the IHS by configuring the primary PCI node to recognize the one or more interconnected PCI expansion nodes and integrate the functions of the interconnected PCI expansion nodes into an expanded PCI subsystem. The primary PCI node and PCI expansion node can be substantially identical IHSs, having the same motherboards and chassis.

21 Claims, 5 Drawing Sheets

(56) References Cited

U.S. PATENT DOCUMENTS

| | | | |
|---|---|---|---|
| 2008/0005377 A1 | 1/2008 | Lambert et al. | |
| 2008/0155156 A1* | 6/2008 | Mussatt | G06F 13/405 |
| | | | 710/301 |
| 2008/0240134 A1 | 10/2008 | Gregg | |
| 2011/0046775 A1* | 2/2011 | Bailey | B07C 3/00 |
| | | | 700/224 |
| 2012/0005539 A1 | 1/2012 | Paul et al. | |
| 2012/0311215 A1 | 12/2012 | Cong | |
| 2013/0073767 A1 | 3/2013 | Gregg et al. | |
| 2013/0173957 A1 | 7/2013 | Paul et al. | |
| 2013/0339587 A1* | 12/2013 | Asnaashari | G06F 12/0246 |
| | | | 711/103 |
| 2015/0286601 A1* | 10/2015 | Buckland | G06F 13/4221 |
| | | | 710/300 |

OTHER PUBLICATIONS

"600-2701 Eight Slot PCI Express Expansion System User's Manual". Revision 1.0. Mar. 2007. Cyclone Microsystems, Inc.*

* cited by examiner

PERIPHERAL COMPONENT INTERFACE (PCI) SYSTEM AND METHOD FOR EXPANDING PCI NODES IN AN INFORMATION HANDLING SYSTEM

BACKGROUND

1. Technical Field

The present disclosure generally relates to information handling systems and in particular to a peripheral component interface (PCI) system and a method for expanding and controlling PCI nodes in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Peripheral component interconnect (PCI) is a local computer bus for attaching hardware devices in an information handling system. The PCI bus supports the functions found on a processor bus but in a standardized format that is independent of any particular processor's native bus. Devices connected to the PCI bus appear to a bus master to be connected directly to its own bus and are the devices are assigned addresses in the processor's address space. Attached devices can take either the form of an integrated circuit mounted to a motherboard or an expansion card that fits into a connector slot. Typical expansion cards include network cards, sound cards, modems, extra ports such as USB or serial, TV tuner cards and disk controllers. Co-processor cards are also commonly used as attached devices, and these co-processors may communicate with each other across the PCI bus and processors in certain applications. A PCI switch is sometimes used in a system design to better enable node to node communication between co-processors.

One problem with current information handling systems is that some applications can benefit from increasing the number of PCI devices, such as co-processors, so that the larger number of devices on a root complex can do greater bandwidth of application work. In a typical system design, the number of PCI devices cannot be increased beyond the number of dedicated device locations. Thus, the conventional implementation of an information handling system cannot have more than the original system design number of PCI devices.

BRIEF SUMMARY

Disclosed is an information handling system, a peripheral component interface (PCI) system and a method for expanding PCI nodes in an information handling system (IHS).

According to one embodiment, the information handling system includes a primary PCI node that has a first PCI switch communicatively coupled to a first processor via a first system interconnect. The first PCI switch is communicatively coupled to a plurality of first PCI devices. A first communication module is communicatively coupled to the first PCI switch. A first PCI expansion node is communicatively coupled to the primary PCI node via a first PCI bus and a first sideband bus. The information handling system executes firmware that enables expansion of the information handling system by configuring the primary PCI node to recognize the one or more interconnected PCI expansion nodes and integrate the functions of the interconnected PCI expansion nodes into an expanded PCI subsystem. The primary PCI node controls others PCI devices coupled to other nodes external to the primary PCI node and allows for the expansion of the number of connected PCI devices.

In one embodiment, the PCI expansion node is the same physical chassis and motherboard system as the primary PCI node. The primary PCI node and the PCI expansion node both include and are in communication via a PCI bus and a sideband bus. The PCI bus supports the transmission of data and instructions between the primary PCI node and the PCI expansion node. The sideband bus carries signals such as power and thermal signals regarding PCI devices within the PCI expansion node.

Also disclosed is a PCI system that includes a primary PCI node. The primary PCI node has a first PCI switch that is communicatively coupled to a first processor via a first system interconnect. The first PCI switch is communicatively coupled to a plurality of first PCI devices. A first communication module is communicatively coupled to the first PCI switch. A first PCI expansion node is communicatively coupled to the primary PCI node via a first PCI bus and a first sideband bus. The information handling system executes firmware that enables expansion of the information handling system by configuring the primary PCI node to recognize the one or more interconnected PCI expansion nodes and integrate the functions of the interconnected PCI expansion nodes into an expanded PCI subsystem. The primary PCI node controls others PCI devices coupled to other nodes external to the primary PCI node and allows for the expansion of the number of connected PCI devices.

According to another embodiment, a method for expanding PCI nodes in an information handling system is disclosed. The method includes triggering a first PCI expansion node to transmit, to a primary PCI node via a first sideband bus, data regarding a plurality of PCI devices in the PCI expansion node. Data is received at the primary PCI node regarding the second PCI devices. An inventory of the PCI devices in the PCI expansion node is generated. The primary PCI node is enabled to access the PCI devices in the PCI expansion node. The primary PCI node controls the PCI devices in the first PCI expansion node.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
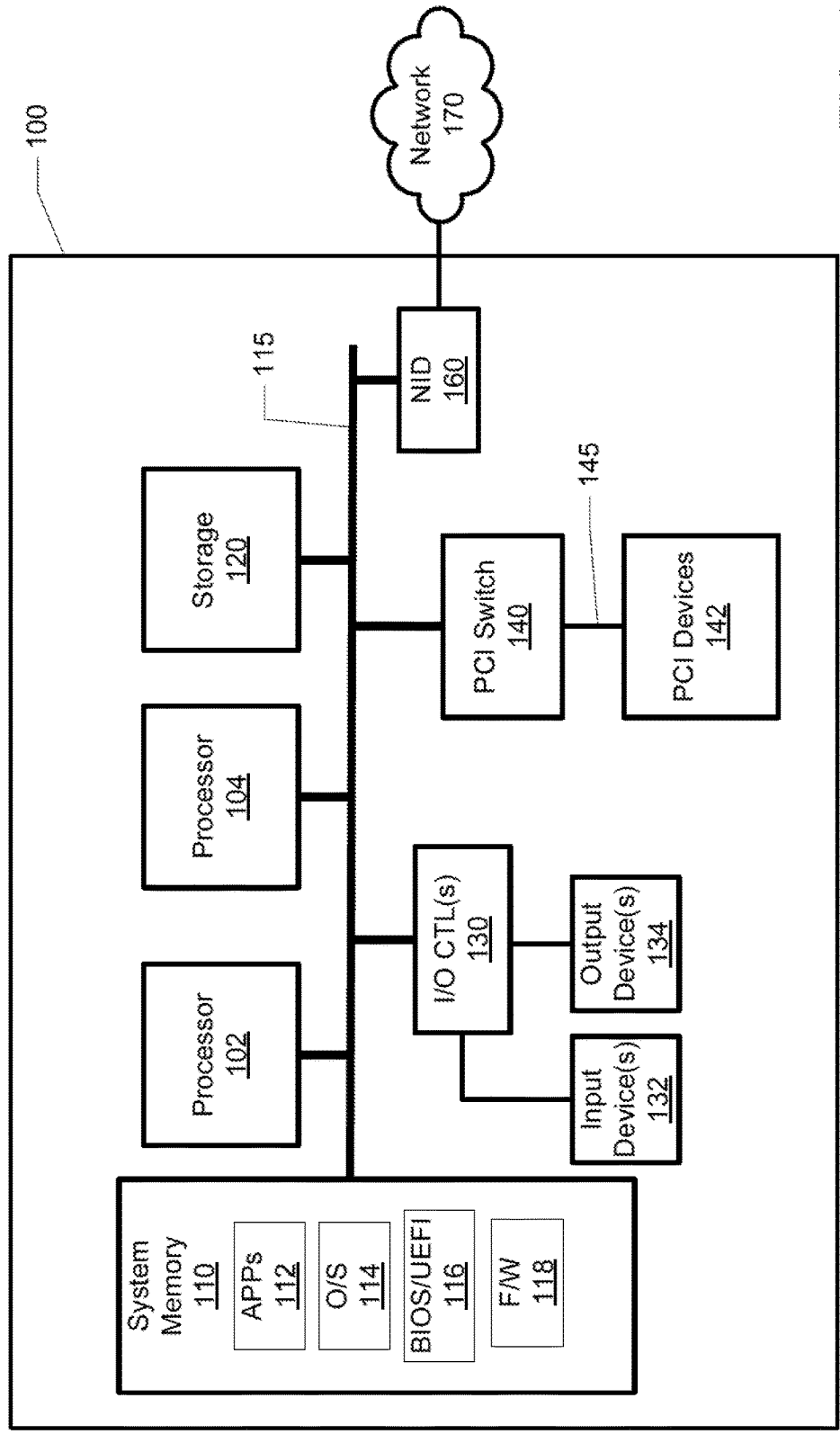
FIG. 1 illustrates an example information handling system within which various aspects of the disclosure can be implemented, according to one or more embodiments.

The illustrative embodiments provide an information handling system (IHS), a peripheral component interface (PCI) system and a method for expanding and controlling additional PCI nodes in an IHS. One aspect of the disclosure involves the recognition that, if using a PCI expansion chassis to increase PCI devices on the root complex, the main system typically does not have communication path about the status and conditions of devices in the separate expansion chassis. The disclosure thus addresses and solves the problem that possible diagnostic and inventory information about the devices in the PCI expansion chassis cannot be easily obtained, nor can the devices be easily managed as devices on the main system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processors, such as processor 102 and 104. Processors 102 and 104 are coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, BIOS/UEFI 116 and firmware (F/W) 118. In one or more embodiments, BIOS/

UEFI image 116 comprises the additional functionality associated with unified extensible firmware interface (UEFI) and can include UEFI images and drivers. The various software and/or firmware modules have varying functionality when their corresponding program code is executed by processors 102 and/or 104 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

IHS 100 further includes a PCI switch 140 that supports connection to and processing of signals from, one or more connected PCI device(s) 142. In one embodiment, PCI device(s) 142 can include graphic processing units and storage devices such as solid state drives. PCI switch 140 is connected to system interconnect 115. PCI switch 140 supports transmission of data to and from PCI devices 142. In another embodiment, IHS 100 can include one or more PCI busses 145 that can be directly connected to one or more PCI device(s) 142. In at least one embodiment, the IHS 100 includes a PCI switch to enable other types of applications that benefit from PCI architecture. As described in further details below, a PCI switch is included in an expansion node. The extra PCI ports are needed to connect the HIC devices, and thus enable the expansion system methodology described herein IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprises multiple devices located across a distributed network, and NID 160 enables IHS 100 to be connected to these other devices. Network 170 can be a local area network, wide area network, personal area network, and the like, and the connection to and/or between network and IHS 100 can be wired or wireless or a combination thereof. For purposes of discussion, Network 170 is indicated as a single collective component for simplicity. However, it is appreciated that network 170 can comprise one or more direct connections to other devices as well as a more complex set of interconnections as can exist within a wide area network, such as the Internet.

Figure 2:
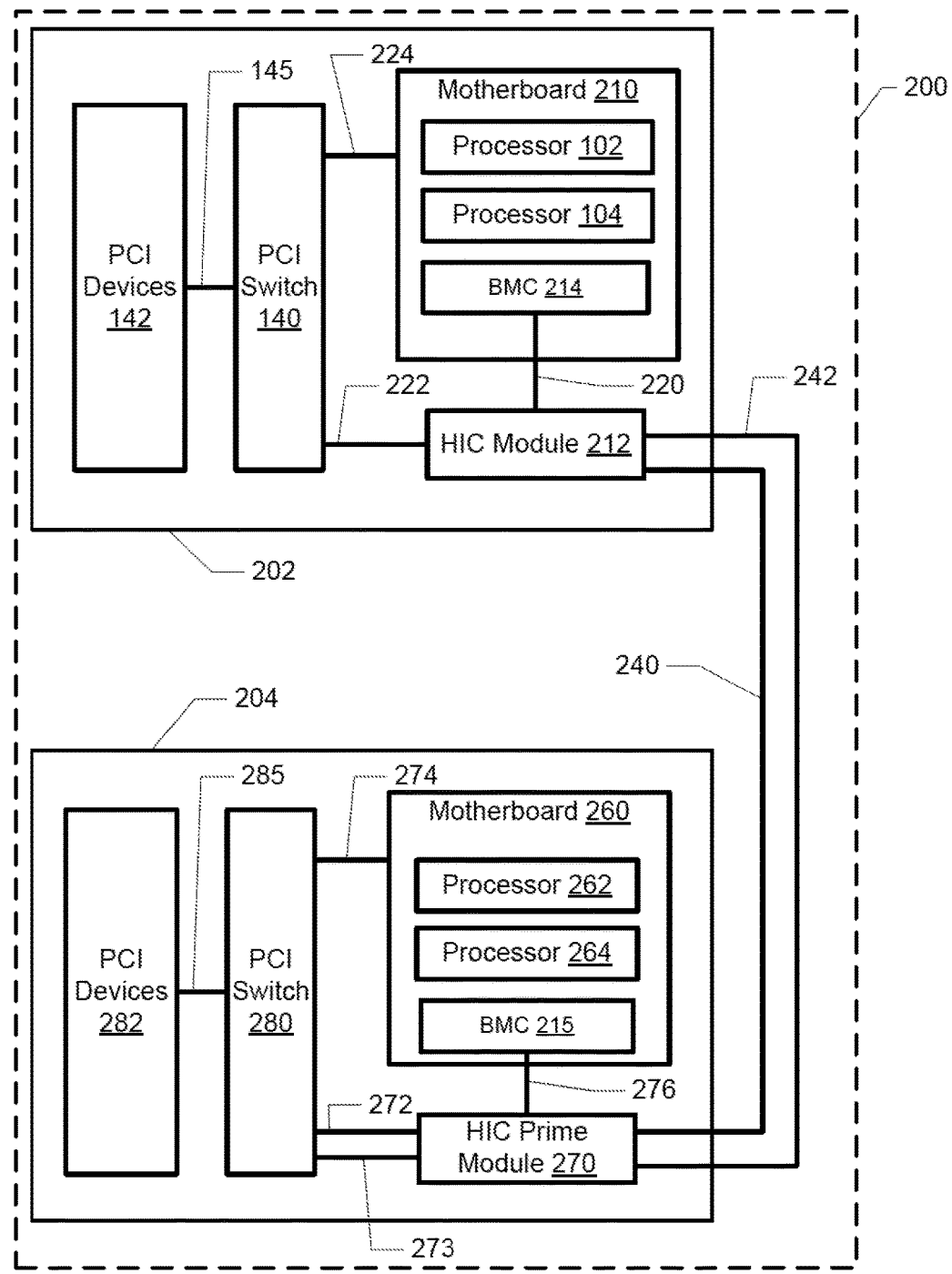
FIG. 2 illustrates an example PCI system, including an expansion of the PCI device control to cover PCI devices on a second PCI node, according to one or more embodiments.

Referring to FIG. 2, one embodiment of a PCI system 200 is shown. PCI system 200 includes a primary or head PCI node 202 that is communicatively coupled to a PCI expansion node 204 via a PCI bus 240 and a sideband bus 242. PCU bus 240 and sideband bus 242 are separate busses that are connected to primary PCI node 202 and PCI expansion node 204. In one embodiment, primary PCI node 202 and PCI expansion node 204 are substantially identical IHS 100 systems, having a same motherboard and chassis.

PCI bus 240 supports the transmission of data and instructions between primary PCI node 202 and PCI expansion node 204. Sideband bus 242 carries signals regarding PCI devices within PCI expansion node 204. In an embodiment, sideband bus 242 can be an I2C bus or a general purpose input/output (GPIO) bus.

Primary PCI node 202 includes processors 102 and 104 that are mounted to a printed circuit motherboard 210. Motherboard 210 holds the main electronic components of primary PCI node 202, such as processors 102 and 104, system memory 110, and other sub-systems, and provides connectors for other peripherals. A base motherboard controller (BMC) 214 is mounted to motherboard 210. In one embodiment, BMC 214 is a separate device as shown in FIG. 2. In another embodiment, BMC 214 can reside within processors 102 and/or 104. BMC 214 contains electronic components and management firmware/software that allow primary PCI node 202 to control power, thermal and diagnostic functions of the entire IHS 200, including PCI expansion node 204. In another embodiment, BMC 215 of PCI expansion node 204 can locally control power, thermal and diagnostics for PCI expansion node 204 independently of primary PCI node 202.

Primary PCI node 202 further includes a host interface card (HIC) module 212 that is communicatively coupled to BMC 214 via a sideband 220. HIC module 212 is a communication circuit that can transmit and receive signals using appropriate communication protocols and timing. HIC module 212 is also communicatively coupled with PCI switch 140 via a local PCI bus 222. PCI switch 140 is also communicatively coupled to motherboard 210 via another system interconnect or sideband 224. In one embodiment, HIC module 212 can be mounted on or directly attached to motherboard 210. In the example shown in FIG. 2, HIC module 212 is a separate module, mounted in a system PCI slot. PCI switch 140 is in communication with PCI devices 142 via local PCI bus 145. HIC module 212 is connected to one end of PCI bus 240 and sideband bus 242. HIC module 212 can transmit and receive data and sideband signals between the PCI primary node 202 and the PCI expansion node 204. This allows working data to be shared across the nodes, memory to be shared across the PCI devices, as well as system management activities.

PCI expansion node 204 includes processors 262 and 264 that are mounted to a printed circuit motherboard 260. Motherboard 260 holds the main electronic components of PCI expansion node 204, such as processors 262 and 264, system memory, and other sub-systems, and provides connectors for other peripherals.

PCI expansion node 204 further includes a host interface card (HIC) module 270 that is communicatively coupled to processor 264 via a sideband 276. HIC module 270 is a communication circuit that can transmit and receive signals using appropriate communication protocols and timing. HIC module 270 is also communicatively coupled with PCI switch 280 via a local PCI bus 272 and sideband 273. PCI switch 280 is communicatively coupled to motherboard 260 via another system interconnect or sideband 274. Sideband signals from PCI Devices 282 can be routed to motherboard 260 via sideband 274 for local power and cooling that are provided for PCI expansion node 204.

PCI switch 280 is in communication with PCI devices 282 via local PCI bus 285. HIC module 270 is connected to the terminal end of PCI bus 240 and sideband bus 242. HIC module 270 can transmit and receive signals from primary PCI node 202.

HIC module 270 is different from HIC module 212 in the way it connects and communicates to the motherboard 260. Both HIC modules have PCI bus connections internal to the system and an external PCI connection. Both HIC modules have sideband connections capabilities. The primary HIC module, 212, has a sideband connection 220 that can connect directly to BMC 220 or to PCI switch 140. In Primary PCI node example 202, HIC module 212 is connected to BMC 214 and can transmit and receive management commands from the BMC 214 and pass them to HIC prime module 270. HIC Prime module 270 can take those management commands and pass them to PCI switch 280 and PCI devices 282. This also allows the inventory and status of PCI devices 282 to be communicated back to primary PCI node 202 and the management software on primary PCI node 202 can manage the PCI devices 282 in PCI expansion node 204.

Figure 3:
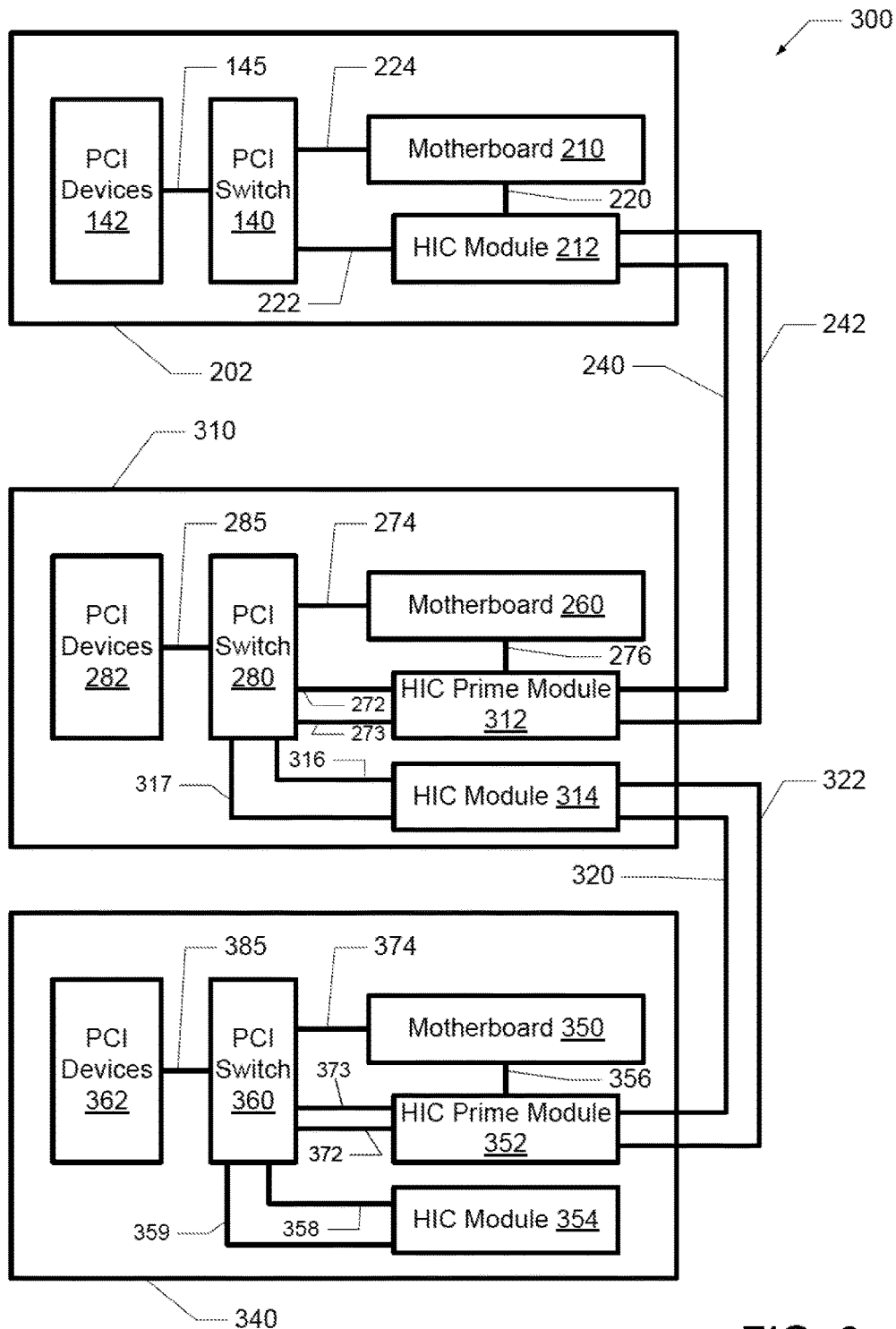
FIG. 3 illustrates another example PCI system that is expanded to include access to and control of secondary devices located on two secondary PCI nodes, according to one or more embodiments.

In this form shown on FIG. 3, HIC Module (212, 314, or 354) is connected to the PCI devices thru the PCI switch, and also to the motherboard BMC. HIC Prime module (312 or 352) are connected only to the PCI switch and PCI devices for the purpose of retransmitting Sideband signals back to the System Management software in the Primary PCI Node. (Note, the PCI devices in the Expansion Nodes must connect to Expansion chassis motherboard for Power and Thermal management. This connection may pass thru HIC prime to local motherboard, or it may just connect directly to the local motherboard BMC.)

FIG. 3 illustrates another embodiment of a PCI system 300. PCI system 300 includes a primary PCI node 202. Primary PCI node 202 is the same as previously described with reference to FIG. 2. Primary PCI node 202 is communicatively coupled to PCI expansion node 310 via a PCI bus 240 and a sideband bus 242. PCI expansion node 310 is communicatively coupled to another PCI expansion node 340 via a PCI bus 320 and a sideband bus 322. While two PCI expansion nodes are shown in FIG. 3, one aspect of the disclosure is that PCI system 300 can have any number of chained PCI expansion nodes chained to each other and controlled via primary PCI node 202. Thus, for example, another PCI system can include three or more PCI expansion nodes. PCI system 300 allows the number of PCI expansion nodes to be increased as needed.

PCI bus 240 supports the transmission of data and instructions between primary PCI node 202 and PCI expansion node 310. PCI buses 240 and 320 combine and support the communication of data and instructions between primary PCI node 202, first PCI expansion node 310, and second PCI expansion node 340. PCI buses 240 and 320 allow data to be shared and memory to be accessed from any of the PCI devices in nodes 202, 310 and 340. Sideband bus 322 carries signals regarding PCI devices 362 within second PCI expansion node 340 for re-transmission to primary PCI node 202 via first PCI expansion node 310. In an embodiment, sideband buses 242 and 322 are I2C buses or GPIO buses. Data transmission to and from network 170 (FIG. 1) is transmitted across the PCI buses 240 and 320 to primary PCI node 202, and thru NID 160.

First PCI expansion node 310 includes motherboard 260, HIC prime module 312 and HIC module 314. HIC prime module 312 and HIC module 314 are communication circuits that can transmit and receive signals using appropriate communication protocols and timing. HIC prime module 312 is communicatively coupled to motherboard 260 via sideband 276. HIC prime module 312 is communicatively coupled to PCI switch 280 via a local PCI bus 272, as well as a sideband 273 PCI switch 280 is communicatively coupled to motherboard 260 via another system interconnect or sideband 274. PCI switch 280 is communicatively coupled to PCI devices 282 via local PCI bus 285. HIC prime module 312 is connected to the terminal end of PCI bus 240 and sideband bus 242. HIC prime module 312 can transmit and receive signals from HIC module 312. HIC module 314 is communicatively coupled to PCI switch 280 via a local PCI bus 316 and sideband 317. The HIC module 314 can also (but does not have to) connect to the motherboard via a sideband bus (not shown). HIC module 314 is connected to the head of PCI bus 320 and sideband bus 322. HIC module 314 can transmit and receive signals from HIC prime module 352.

With continued reference to FIG. 3, second PCI expansion node 340 includes motherboard 350, PCI switch 360, PCI devices 362, HIC prime module 352 and HIC module 354. HIC prime module 352 and HIC module 354 are communication circuits that can transmit and receive signals using appropriate communication protocols and timing. HIC prime module 352 is communicatively coupled to motherboard 350 via sideband 356. HIC prime module 352 is in communicatively coupled with PCI switch 360 via a local PCI bus 372 and sideband 373. PCI switch 360 is communicatively coupled to motherboard 350 via another system interconnect or sideband 374. PCI switch 360 is communicatively coupled with PCI devices 362 via local PCI bus 385. HIC prime module 352 is connected to the terminal end of PCI bus 320 and sideband bus 322. HIC prime module 312 can transmit and receive signals from HIC module 314. HIC module 354 is in communication with PCI switch 280 via a local PCI bus 358 and sideband 359.

Figure 4:
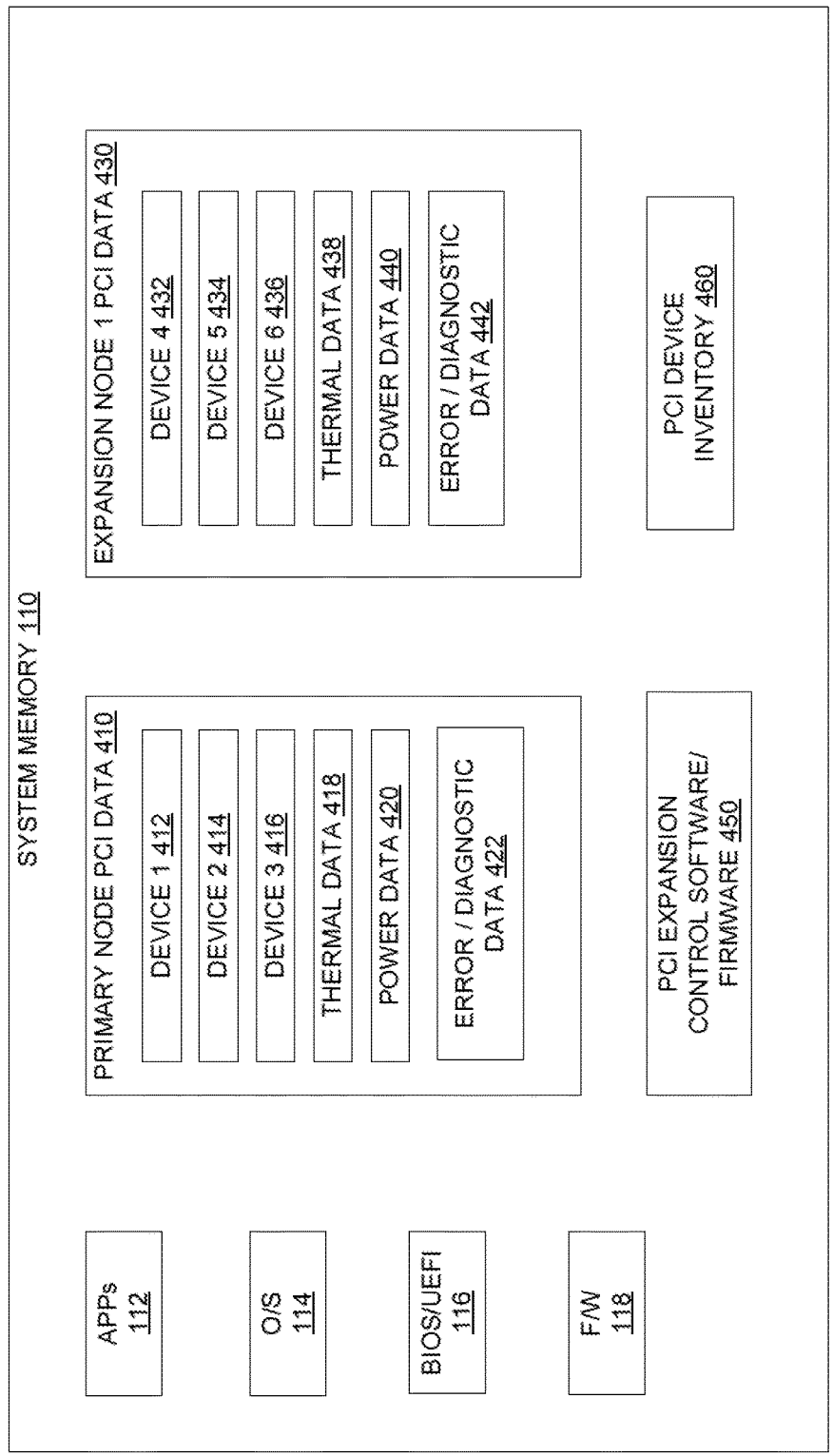
FIG. 4 illustrates example contents of a system memory, in accordance with one embodiment that includes software and firmware to support the PCI expansion functions.

With reference now to FIG. 4, one embodiment of example contents of system memory 110 of an IHS operating as a primary PCI node 202 is shown. In the description of FIG. 4, reference is also made to specific components illustrated within the preceding FIGS. 1-3. System memory 110 stores software and/or firmware modules including application(s) 112, operating system (O/S) 114, BIOS/UEFI 116, firmware (F/W) 118, and primary node PCI data 410. Primary node PCI data 410 stores data associated with primary PCI node devices 142. Primary node PCI data 410 includes device 1 data 412, device 2 data 414 and device 3 data 416. Device data 1-3 412-416 can include the type of PCI device, the number of PCI devices, the device capabilities, and operating parameters of the PCI devices.

Primary node PCI data 410 further includes thermal data 418, power data 420 and error/diagnostic data 422. Thermal data 418 can include temperature sensor readings and cooling fan settings for PCI devices 142. Power data 420 includes data on power usage by PCI devices 142. Error/diagnostic data 422 can include errors observed during the operation of PCI devices 142 and any errors detected during diagnostic testing.

System memory 110 further includes expansion node 1 PCI data 430. Expansion node 1 PCI data 430 stores data associated with PCI devices 282. Expansion node 1 PCI data 430 includes device 4 data 432, device 5 data 434 and device 6 data 436. Device data 432-436 can include the type of PCI device, the device capabilities and operating parameters. Expansion node 1 PCI data 430 further includes thermal data 438, power data 440 and error/diagnostic data 442. Thermal data 438 can include temperature sensor readings and cooling fan settings for PCI devices 282. Power data 440 includes data on power usage by PCI devices 282. Error data/diagnostic 442 can include errors observed during the operation of PCI devices 282 and any errors detected during diagnostic testing.

System memory 110 further stores PCI expansion control software/firmware 450 and PCI device inventory 460. PCI expansion control software/firmware 450 is a software and/or firmware module that allows for the expansion of PCI nodes within PCI system 200 or 300 by the connection of additional PCI nodes. PCI expansion control software/firmware 450 is executed by processors 102 and/or 104 within primary PCI node 202. PCI device inventory 460 is a listing of the connected PCI devices within PCI system 200 or 300.

The IHS and specifically a processor on motherboard 210 (i.e. processor 102 or 104) executes PCI expansion control software/firmware 450 that enables expansion of the IHS by configuring the primary PCI node 202 to recognize the one or more interconnected PCI expansion nodes 204 or 310 and 340 and integrate the functions of the interconnected PCI expansion nodes into an expanded PCI subsystem.

In one embodiment, a processor on motherboard 210 triggers PCI expansion node 204 to transmit, to primary PCI node 202 via sideband bus 242, data 430 regarding the PCI devices 282 in the PCI expansion node 204. The data 430 is received regarding the second PCI devices 282 at the primary PCI node 202. An inventory 460 of the PCI devices 282 in the PCI expansion node 204 is generated. The primary PCI node 202 is enabled to access the PCI devices 282 in the PCI expansion node 204.

Those of ordinary skill in the art will appreciate that the hardware and software/firmware components and basic configuration depicted in FIGS. 1-4 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 5:
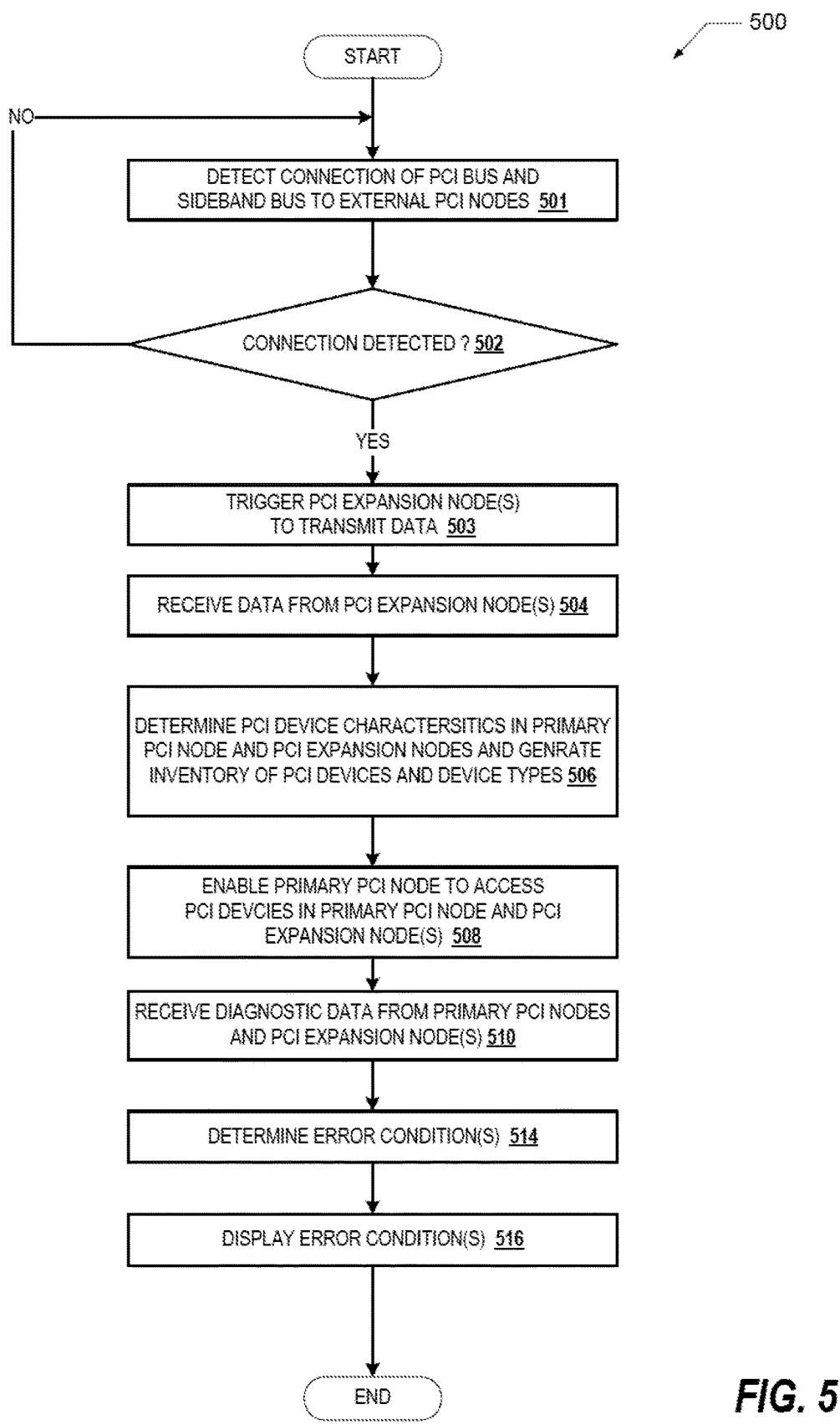
FIG. 5 is a flow chart illustrating one example of a method for expanding PCI nodes in an information handling system.

FIG. 5 illustrates a flowchart of an exemplary method 500 by which processors 102 and/or 104 within the preceding figures performs different aspects of the processes that enable the one or more embodiments of the disclosure. Generally, method 500 represents a computer-implemented method for expanding PCI nodes in an IHS. The description of method 500 is provided with general reference to the specific components illustrated within the preceding FIGS. 1-4. Generally method 500 is described as being implemented via processor 104 and particularly the execution of code provided by PCI expansion control software 450 acting within processor 104. It is however appreciated that certain aspects of the described methods may be implemented via other processing devices and/or execution of other code.

Referring now to the flow chart of FIG. 5, method 500 begins at the start block and proceeds to block 501 where processor 104 detects the connection of PCI bus 240 and sideband bus 242 to the external PCI expansion node 204. At decision block 502, processor 104 determines if the connection of PCI bus 240 and sideband bus 242 to the external PCI expansion node 204 has been detected. This detection is performed at the boot stage or during BIOS loading. In response to no connection to PCI expansion node 204 being detected, processor 104 returns to block 501 to continue detecting the connection of PCI bus 240 and sideband bus 242 to the external PCI expansion node 204. In response to the connection to PCI expansion node 204 being detected, processor 104 triggers the PCI expansion node 204 to transmit, to primary PCI node 202 via sideband bus 242, expansion node 1 data 430 regarding the PCI devices 282 in the PCI expansion node 204 (block 503). Processor 104 receives the expansion node 1 data 430 from PCI expansion node 204 (block 504). Processor 104 determines the PCI device characteristics of the PCI devices 142 in the primary PCI node 202 and the PCI devices 282 in the PCI expansion node 204 and generates PCI device inventory 460 (block 506). PCI device inventory 460 contains a listing of the PCI devices and device types in the connected primary PCI node and the PCI expansion nodes. The primary PCI node 202 is enabled to access and control the PCI devices 142 and the PCI devices 282 in the external PCI expansion node 204 (block 508). Processor 104, via the execution of code provided by PCI expansion control software 450 acting within processor 104 accesses and controls the primary PCI devices 142 and the secondary PCI devices 282. Because all of the PCI devices are on a common PCI connection via PCI buses 240 and 320, any of the PCI devices in any of the nodes (e.g. nodes 202, 204, 310 and 340) can execute code and transmit commands, or share memory with any of the other PCI devices in any of the nodes.

At block 510, processor 104 receives error/diagnostic data 442 regarding the PCI devices 282. Processor 104 determines one or more error conditions associated with at least one of the PCI devices 282 (block 514) and displays the error conditions on output device 134 (block 516). Method 500 then ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   a primary peripheral component interface (PCI) node having:
      a first PCI switch communicatively coupled to a first processor via a first system interconnect, the first PCI switch communicatively coupled to a plurality of first PCI devices;
      a first communication module communicatively coupled to the first PCI switch; and
      a first base motherboard controller (BMC), the first BMC configured to control power and thermal functions of the first PCI devices;
   a first PCI expansion node interconnected and communicatively coupled to the primary PCI node via a first PCI bus and a first sideband bus, the first PCI expansion node comprising a local BMC that controls local power and thermal functions of the expansion node a second PCI switch communicatively coupled to a second communication module via a second system interconnect, the second PCI switch communicatively coupled to a plurality of second PCI devices, wherein side band signals communicated on the first sideband bus enable the primary PCI node to access errors, inventory, and diagnostics of the plurality of second PCI devices coupled to the first PCI expansion node, wherein the local BMC is a separate device from the first BMC and locally controls power, thermal and diagnostics for the first PCI expansion node independently of the primary PCI node;
   a processor communicatively coupled to the primary PCI node via a first system interconnect and controlling input/output operations involving the primary PCI node; and
   firmware executing within the IHS that enables PCI-based expansion of the IHS by configuring the primary PCI node to recognize each interconnected PCI expansion node and integrate functions of the interconnected PCI expansion nodes into an expanded PCI subsystem.

2. The information handling system of claim 1, wherein the second communication module is communicatively coupled to the second PCI switch via the second system interconnect and communicatively coupled to the first communication module via both the first PCI bus and the sideband bus.

3. The information handling system of claim 2, wherein the first sideband bus is utilized to communicate data corresponding to the second PCI devices in the first PCI expansion node to the primary PCI node.

4. The information handling system of claim 3, wherein the data corresponding to the second PCI devices includes at least one of:
   thermal management data;
   power management data;
   PCI device data;
   error data; and
   diagnostic data.

5. The information handling system of claim 2, further comprising:

a third communication module communicatively coupled to the second PCI switch, the third communication module adapted to communicate with a second PCI expansion node via a second PCI bus and a second sideband bus.

6. The information handling system of claim 5, wherein the second PCI expansion node further comprises:
a third PCI switch communicatively coupled to a fourth communication module via a third system interconnect and communicatively coupled to a plurality of third PCI devices; and
the fourth communication module communicatively coupled to the third PCI switch and communicatively coupled to the third communication module via the second PCI bus and the second sideband bus.

7. The information handling system of claim 1, wherein the firmware further configures the IHS to:
trigger the first PCI expansion node to transmit data regarding a plurality of second PCI devices to the primary PCI node via the first sideband bus;
receive data regarding the second PCI devices; and
determine at least one PCI device characteristic associated with the second PCI devices from the received data.

8. The information handling system of claim 7, wherein the firmware further configures the IHS to:
receive, via the sideband bus, diagnostic data regarding the second PCI devices;
determine an error condition associated with at least one of the second PCI devices; and
display the error condition.

9. The information handling system of claim 1, wherein the primary PCI node and the first PCI expansion node each have substantially identical chassis and motherboard.

10. A peripheral component interface (PCI) system comprising:
a primary PCI node having:
a first PCI switch communicatively coupled to a first processor via a first system interconnect, the first PCI switch communicatively coupled to a plurality of first PCI devices;
a first communication module communicatively coupled to the first PCI switch; and
a first base motherboard controller (BMC), the first BMC configured to control power and thermal functions of the first PCI devices;
a first PCI expansion node interconnected and communicatively coupled to the primary PCI node via a first PCI bus and a first sideband bus, the first PCI expansion node comprising a local BMC that controls local power and thermal functions of the expansion node a second PCI switch communicatively coupled to a second communication module via a second system interconnect, the second PCI switch communicatively coupled to a plurality of second PCI devices, wherein side band signals communicated on the first sideband bus enable the primary PCI node to access errors, inventory, and diagnostics of the plurality of second PCI devices coupled to the first PCI expansion node, wherein the local BMC is a separate device from the first BMC and locally controls power, thermal and diagnostics for the first PCI expansion node independently of the primary PCI node; and
firmware executing within an information handling system (IHS) housing the PCI system that enables expansion of the IHS by configuring the primary PCI node to recognize one or more interconnected PCI expansion nodes and integrate the functions of the one or more interconnected PCI expansion nodes into an expanded PCI subsystem.

11. The PCI system of claim 10, wherein
the second communication module is communicatively coupled to the second PCI switch via the second system interconnect and communicatively coupled to the first communication module via both the first PCI bus and the sideband bus.

12. The PCI system of claim 11, wherein the first sideband bus enables data corresponding to the second PCI devices in the first PCI expansion node to be communicated to the primary PCI node.

13. The PCI system of claim 12, wherein the data corresponding to the second PCI devices includes at least one of:
thermal management data;
power management data;
PCI device data;
error data; and
diagnostic data.

14. The PCI system of claim 11, further comprising:
a third communication module communicatively coupled to the second PCI switch, the third communication module adapted to communicate with a second PCI expansion node via a second PCI bus and a second sideband bus.

15. The PCI system of claim 14, wherein the second PCI expansion node further comprises:
a third PCI switch communicatively coupled to a fourth communication module via a third system interconnect and communicatively coupled to a plurality of third PCI devices;
the fourth communication module communicatively coupled to the third PCI switch and communicatively coupled to the third communication module via the second PCI bus and the second sideband bus.

16. The PCI system of claim 10, wherein the firmware further configures the system to:
trigger the first PCI expansion node to transmit data regarding a plurality of second PCI devices to the primary PCI node via the first sideband bus;
receive data regarding the second PCI devices; and
determine at least one PCI device characteristic associated with the second PCI devices from the received data.

17. The PCI system of claim 16, wherein the firmware further configures the system to:
receive, via the sideband bus, diagnostic data regarding the second PCI devices;
determine an error condition associated with at least one of the second PCI devices; and
display the error condition.

18. The PCI system of claim 10, wherein the primary PCI node and the first PCI expansion node each have identical chassis and motherboards.

19. A computer implemented method for expanding PCI nodes in an information handling system (IHS), the method comprising:
providing a first PCI expansion node interconnected and communicatively coupled to a primary PCI node via a first PCI bus and a first sideband bus,
the primary PCI node having: a first PCI switch communicatively coupled to a first processor via a first system interconnect, the first PCI switch communicatively coupled to a plurality of first PCI devices; a first communication module communicatively coupled to the first PCI switch; and a first base motherboard controller (BMC), the first BMC configured to control power and thermal functions of the first PCI devices; and the first PCI expansion node comprising a local BMC that controls local power and thermal functions of the expansion node a second PCI switch communicatively coupled to a second communication module via a second system interconnect, the second PCI switch communicatively coupled to a plurality of second PCI devices, wherein side band signals communicated on the first sideband bus enable the primary PCI node to access errors, inventory, and diagnostics of the plurality of second PCI devices coupled to the first PCI expansion node, wherein the local BMC is a separate device from the first BMC and locally controls power, thermal and diagnostics for the first PCI expansion node independently of the primary PCI node;

triggering the first PCI expansion node to transmit, to the primary PCI node via a first sideband bus, data regarding the plurality of PCI devices in the PCI expansion node;

receiving data regarding the second PCI devices at the primary PCI node;

generating an inventory of the PCI devices coupled to the PCI expansion node;

enabling the primary PCI node to access the PCI devices in the PCI expansion node; and controlling, via the primary PCI node, the PCI devices in the first PCI expansion node.

20. The method of claim 19, wherein the received data comprises at least one of:
thermal management data;
power management data;
PCI device inventory data;
error data; and
diagnostic data.

21. The method of claim 19, further comprising:
receiving diagnostic data and error data regarding the second PCI devices;
determining an error condition associated with at least one of the second PCI devices; and
displaying the error condition.

* * * * *